(12) United States Patent
Tuncer

(10) Patent No.: US 8,315,032 B2
(45) Date of Patent: Nov. 20, 2012

(54) HIGH POWER DENSITY CAPACITOR AND METHOD OF FABRICATION

(75) Inventor: Enis Tuncer, Knoxville, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 266 days.

(21) Appl. No.: 12/838,237

(22) Filed: Jul. 16, 2010

(65) Prior Publication Data

US 2012/0014034 A1    Jan. 19, 2012

(51) Int. Cl.
*H01G 4/30* (2006.01)
(52) U.S. Cl. .................. 361/301.4; 361/301.5; 361/312; 361/313; 361/321.1; 361/306.2
(58) Field of Classification Search ............... 361/301.4, 361/301.2, 301.5, 303–305, 311–313, 321.1, 361/321.2, 306.2
See application file for complete search history.

(56) References Cited

U.S. PATENT DOCUMENTS

| | | | |
|---|---|---|---|
| 3,094,651 A | 6/1963 | Lehner et al. | |
| 3,252,830 A | 5/1966 | Cummin et al. | |
| 3,256,472 A | 6/1966 | Centurioni | |
| 3,457,478 A | 7/1969 | Lehrer | |
| 3,761,772 A | 9/1973 | Suzuki et al. | |
| 4,110,878 A | 9/1978 | Wenzel | |
| 4,434,209 A | 2/1984 | Sasaki et al. | |
| 4,908,574 A * | 3/1990 | Rhoades et al. | 324/675 |
| 5,933,317 A | 8/1999 | Moncrieff | |
| 6,092,269 A * | 7/2000 | Yializis et al. | 29/25.42 |
| 6,556,421 B2 | 4/2003 | Aoki et al. | |
| 6,699,265 B1 | 3/2004 | O'Phelan et al. | |
| 7,002,234 B2 * | 2/2006 | Aisenbrey | 257/532 |
| 7,057,881 B2 * | 6/2006 | Chow et al. | 361/508 |
| 7,150,904 B2 | 12/2006 | D'Urso et al. | |
| 7,157,671 B2 | 1/2007 | O'Phelan et al. | |
| 7,258,731 B2 | 8/2007 | D'Urso et al. | |
| 7,365,958 B2 | 4/2008 | Yamazaki et al. | |

(Continued)

FOREIGN PATENT DOCUMENTS

EP    0 545 812 A1    6/1993

(Continued)

OTHER PUBLICATIONS

Co-pending U.S. Appl. No. 12/830,070, filed Jul. 16, 2010, "Clad Fiber Capacitor and Method of Making Same".

(Continued)

*Primary Examiner* — Nguyen T Ha
(74) *Attorney, Agent, or Firm* — Pauley Petersen & Erickson

(57) ABSTRACT

A ductile preform for making a drawn capacitor includes a plurality of electrically insulating, ductile insulator plates and a plurality of electrically conductive, ductile capacitor plates. Each insulator plate is stacked vertically on a respective capacitor plate and each capacitor plate is stacked on a corresponding insulator plate in alignment with only one edge so that other edges are not in alignment and so that each insulator plate extends beyond the other edges. One or more electrically insulating, ductile spacers are disposed in horizontal alignment with each capacitor plate along the other edges and the pattern is repeated so that alternating capacitor plates are stacked on alternating opposite edges of the insulator plates. A final insulator plate is positioned at an extremity of the preform. The preform may then be drawn to fuse the components and decrease the dimensions of the preform that are perpendicular to the direction of the draw.

9 Claims, 7 Drawing Sheets

U.S. PATENT DOCUMENTS

| | | | |
|---|---|---|---|
| 7,419,873 B2 | 9/2008 | Doffing et al. | |
| 7,697,807 B2 | 4/2010 | D'Urso et al. | |
| 7,697,808 B2 | 4/2010 | D'Urso et al. | |
| 7,764,498 B2 * | 7/2010 | Conn | 361/699 |
| 7,864,505 B1 * | 1/2011 | O'Brien et al. | 361/311 |
| 2009/0030152 A1 | 1/2009 | Zhang et al. | |
| 2009/0122462 A1 | 5/2009 | Suzuki et al. | |
| 2010/0020468 A1 | 1/2010 | Tan et al. | |
| 2010/0067172 A1 | 3/2010 | Zhang et al. | |
| 2010/0177461 A1 | 7/2010 | Tuncer | |
| 2010/0178418 A1 | 7/2010 | Tuncer | |

FOREIGN PATENT DOCUMENTS

| | | |
|---|---|---|
| JP | 63288007 A | 11/1988 |
| WO | WO 01/38076 A1 | 5/2001 |
| WO | WO 2009/151694 A2 | 12/2009 |

OTHER PUBLICATIONS

J.A. Fernie et al., "Joining of engineering ceramics," Int'l Materials Reviews, vol. 54, No. 5, Sep. 2009, pp. 283-331.

S. Sukhoveyev, "Ultra high aspect-ratio MEMS and NEMS on basis of fibrous composite technology," Microsyst Technol, vol. 14, No. 8, Aug. 2008, pp. 1099-1110.

H. Xu et al., "Enhanced dielectric properties and positive temperature coefficient effect in the binary polymer composites with surface modification carbon black," J. Mater., Chem., 2008, vol. 18, pp. 229-234.

T. Huang et al., "Temperature-dependent ultra-thin polymer layer for low voltage organic thin-film transistors," Organic Electronics, vol. 11, Issue 4 Apr. 2010, pp. 618-625.

Lu, "High dielectric constant polymer nanocomposites for embedded capacitor applications," Georgia Institute of Technology, Dissertations, Sep. 17, 2008.

N. Venkat et al., "High temperature polymer film dielectrics for aerospace power conditioning capacitor applications," Materials Science and Engineering: B, Sep. 2009.

T. Pratyush, "Interfacial effects in oxide-polymer laminar composite thin film dielectrics for capacitor applications," Pennsylvania State University, 2009 (190 pages).

Lu et al., "Synthesis and dielectric properites of novel high-K polymer composites containing in-situ formed silver nanoparticles for embedded capacitor applications," J. of Materials Chemistry, Feb. 8, 2006.

* cited by examiner

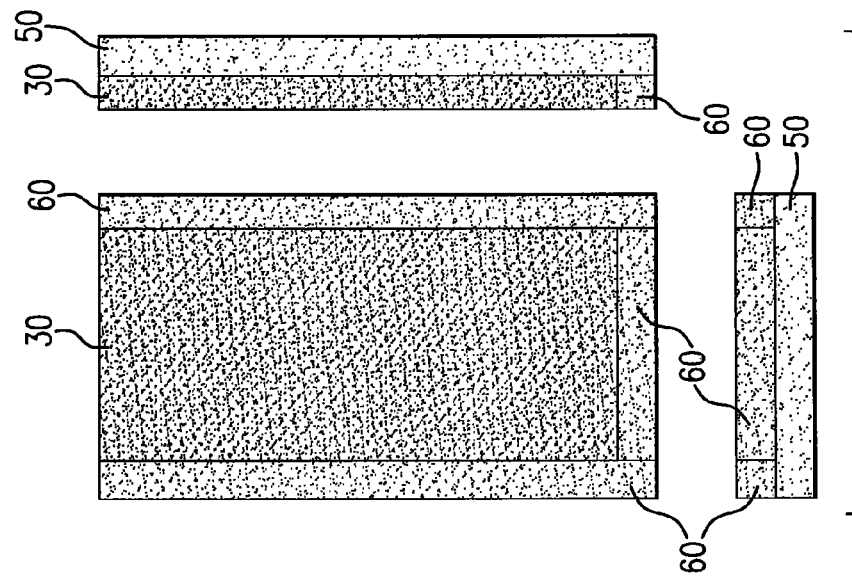
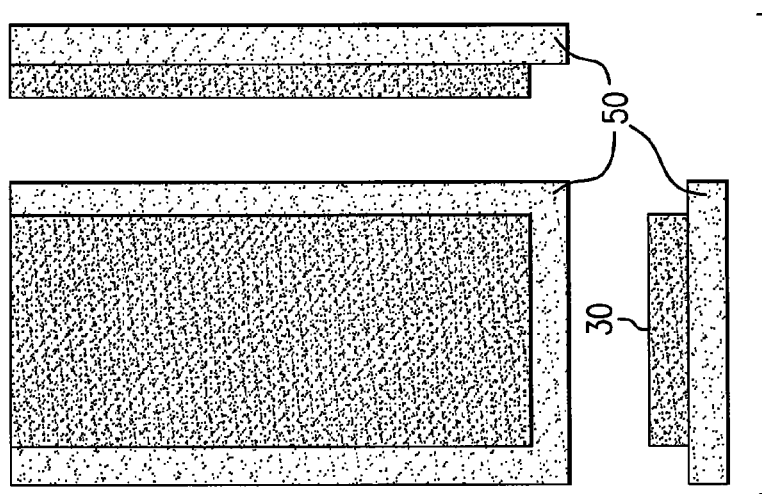
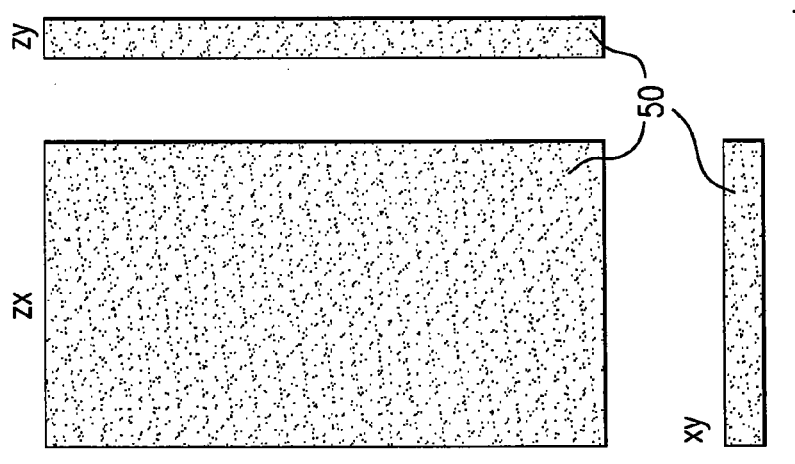

HIGH POWER DENSITY CAPACITOR AND METHOD OF FABRICATION

GOVERNMENT RIGHTS

This invention was made with government support under Contract No. DE-AC05-00OR22725 awarded by the U.S. Department of Energy. The government has certain rights in the invention.

FIELD OF THE INVENTION

The present invention relates to fabrication of high energy density capacitor devices using a drawn preform.

BACKGROUND OF THE INVENTION

Capacitors generally comprise two conductors, such as parallel metal plates, insulated from each other by a dielectric and are typically used to store electric energy. Current capacitors generally have low power densities and cannot effectively operate or maintain operation at high temperatures.

As such, there exists a need for capacitors that are operable at high temperatures with sufficient capacity for use in specialized applications like defense, aerospace and transportation. Likewise, a need exists for a capacitor for use in such applications that is physically adaptable to various form factors.

SUMMARY OF THE INVENTION

A capacitor according to the subject invention is constructed using one or more preforms as the building blocks for a desired capacitor. A ductile preform for making a drawn capacitor preferably includes a plurality of electrically insulating, ductile insulator plates and a plurality of electrically conductive, ductile capacitor plates stacked in alternating succession.

Each insulator plate is preferably stacked vertically on a respective capacitor plate and each capacitor plate is stacked on a corresponding insulator plate in alignment with only one edge so that other edges are not in alignment with the corresponding insulator plate and so that each insulator plate extends beyond the other edges. One or more electrically insulating, ductile spacers are disposed in horizontal alignment with each capacitor plate along these other edges and the pattern is repeated so that alternating capacitor plates are stacked on alternating opposite edges of the insulator plates. A final insulator plate is positioned at an extremity of the preform.

The preform may then be drawn to fuse the components and decrease the dimensions of the preform that are perpendicular to the direction of the draw. The dimensions of the dielectric layer, the sized of the electrodes and the number of layers in the preform determine the capacitance of the resulting capacitor, together with the pulling parameters. Once the preform assembly is constructed, it can be pulled and the structure can be shrunk to a smaller size.

As the structure is drawn to smaller and smaller ratios, the total capacitance increases accordingly. If the number of layers within the preform is increased or the thickness of each stack in the preform are reduced, the capacitance may be further increased. The materials used for fabrication of the described preforms are high temperature materials thereby resulting in capacitor devices with high power densities can be fabricated for high temperature, high power density application needs, such as in power electronic circuits in the transportation, space and defense industries.

BRIEF DESCRIPTION OF THE DRAWINGS

The above-mentioned and other features and objects of this invention will be better understood from the following detailed description taken in conjunction with the drawings wherein:

FIG. 3A-3F are schematic views of a partially assembled preform including spacer dielectric, electrode and dielectric according to one preferred embodiment of this invention;

DETAILED DESCRIPTION OF THE INVENTION

FIGS. 1-5 show various preferred embodiments of the invention. Preforms 10 in the figures are shown schematically and, as such, the scale and relationship of the various components may be adjusted for clarity and discussion.

As described herein, the preforms 10 are used in the manufacture of a capacitor or a structure having capacitive properties. Such structures may include strands, fabrics, molded components and/or other structures that may be configured to suit a particular application.

Figure 1:
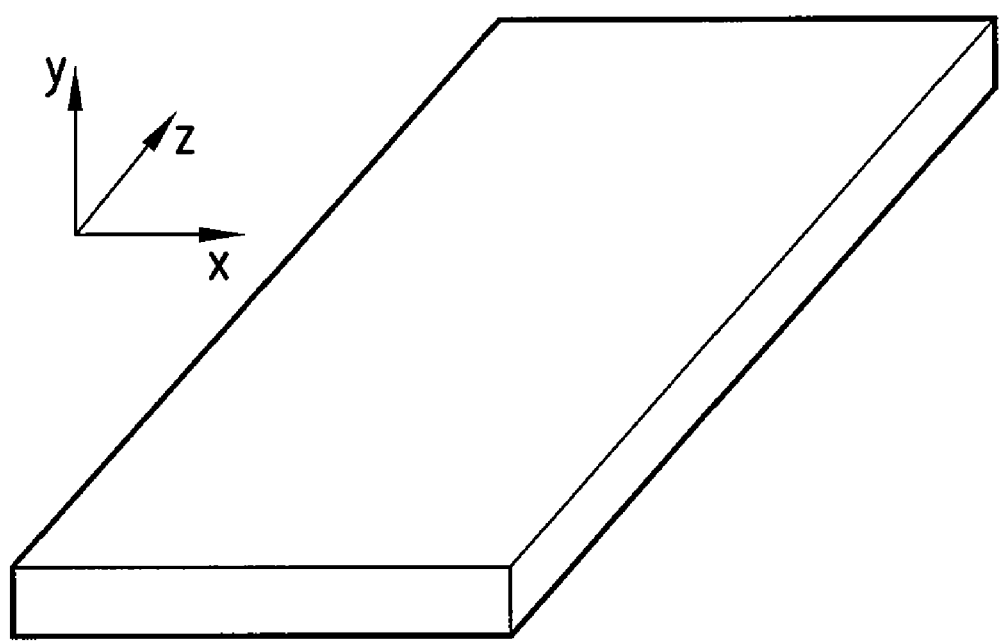
FIG. 1 is a schematic perspective front view of a spacer dielectric according to one preferred embodiment of this invention.

According to one preferred embodiment of the invention, a preform 10 used in the manufacture of a capacitor includes a plurality of ductile plates arranged in a stack 20. FIG. 1 shows one approximate configuration of a representative plate. As described below, the stack 20 preferably includes a series of alternating plates having different physical properties to produce a preform 10 that forms a generally continuous well-defined capacitor structure.

Figure 2C:
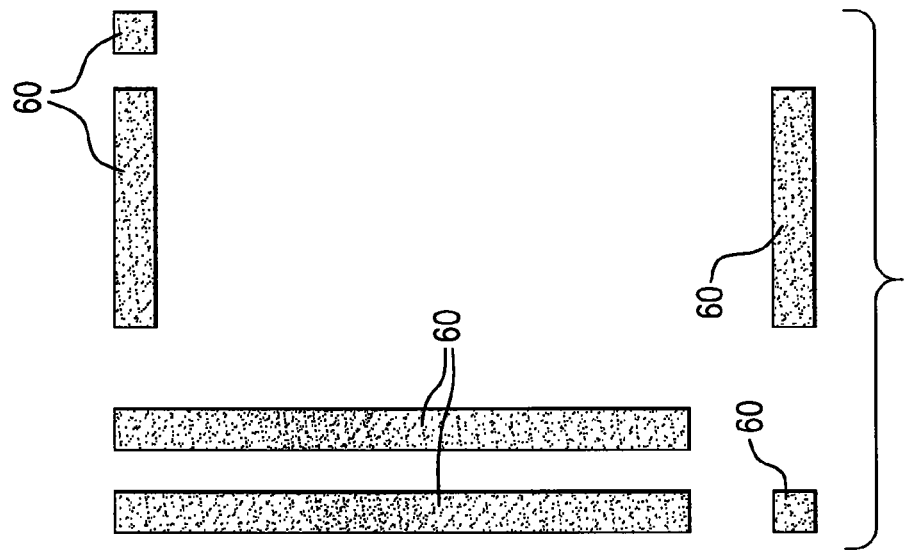
FIGS. 2A-2C are schematic views of preform components including spacer dielectric, electrode and dielectric according to one preferred embodiment of this invention.
Figure 2B:
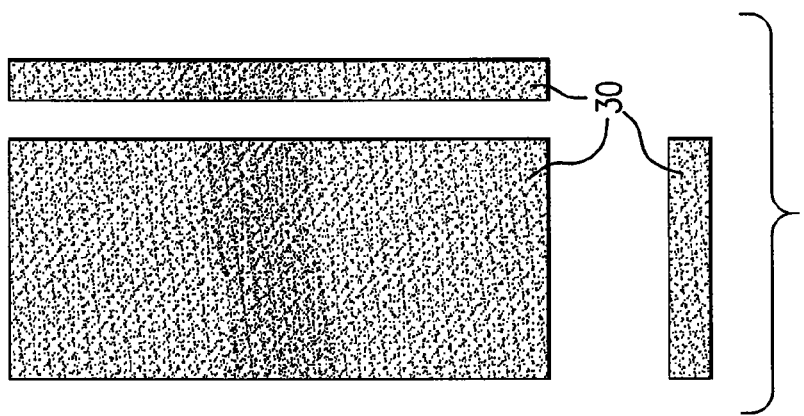
Figure 2A:
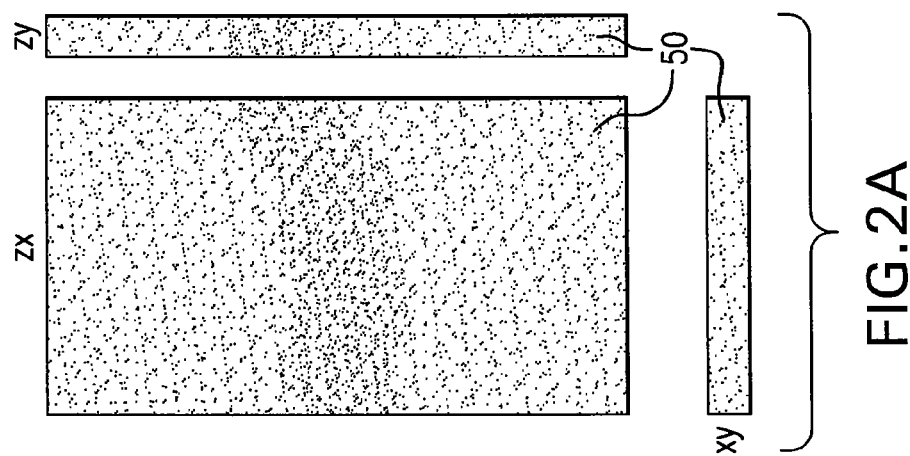

The preform 10 preferably includes plurality of electrically conductive, ductile capacitor plates 30, such as shown in various views in FIG. 2A. According to a preferred embodiment of this invention, the electrically conductive capacitor plates 30 are preferably formed of a conducting or semiconducting material and may comprise a material selected from the group consisting of: glass, metal, ceramic, polymer and resin. Examples include stainless steel, copper, aluminum, or nickel plates; solder alloys; metal fiber, silicon carbide or carbon filled glass composites; and semi-conducting glasses. Carbon or metal powder-filled conducting polymers are also suitable materials. The capacitor plates 30 preferably have a known softening temperature.

The preform 10 preferably further includes a plurality of electrically insulating, ductile, insulator plates 50, such as shown in various views in FIG. 2B. The insulator plates 50 are preferably stacked in alternating fashion with the capacitor plates 30. According to a preferred embodiment of this invention, the insulator plates 50 are preferably a dielectric material having a high dielectric permittivity such as glass or polymer but may comprise any suitable material selected from the group consisting of: glass, ceramic, polymer and resin. More specifically, the insulator plates 50 may be selected from the group consisting of soda-lime glass, boron-silicate glass, potash-lead-silicate glass, polymeric material, and combinations thereof. The insulator plates 50 preferably have a known softening temperature proximate to the softening temperature of the capacitor plates 30.

The preform 10 preferably further includes a plurality of electrically insulating, ductile spacers 60 positioned within the stack 20, such as shown in various views in FIG. 2C. The spacers 60 are preferably a dielectric material having a high dielectric permittivity and may be the same or similar material or materials as the insulator plates 50. As described, each spacer 60 is preferably positioned within a respective layer of the stack 20 that also includes a respective capacitor plate 30. The spacers 50 preferably have a known softening temperature proximate to the softening temperature of the insulator plates 50 and/or the capacitor plates 30.

As shown and described, each of the capacitor plates 30, insulator plates 50 and spacers 60 preferably include a common or similar thickness. In particular, the capacitor plates 30 and the spacers 60 preferably share a common thickness.

Figure 3F:
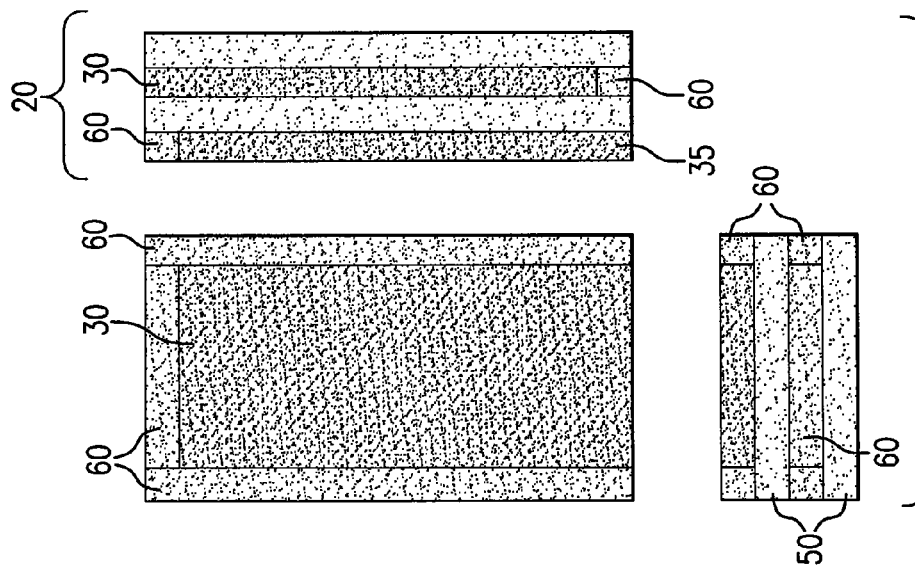
Figure 3E:
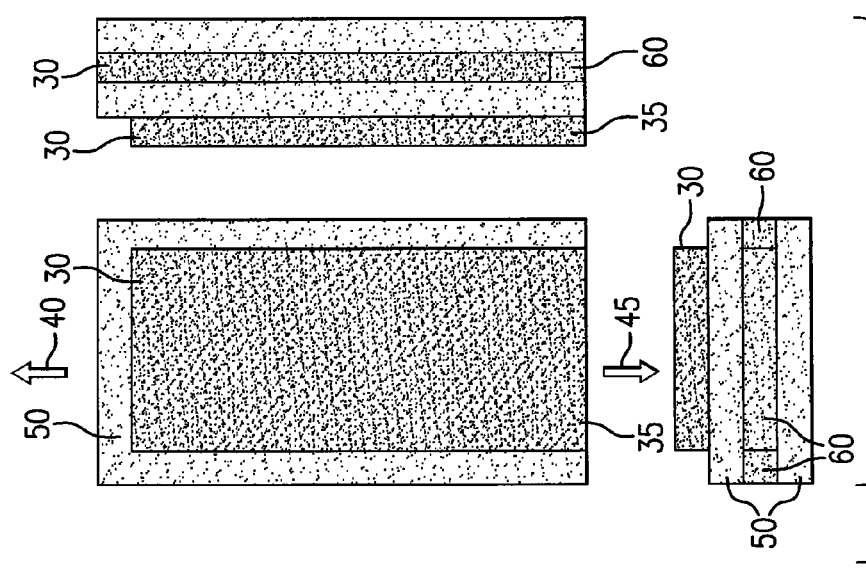
Figure 3D:
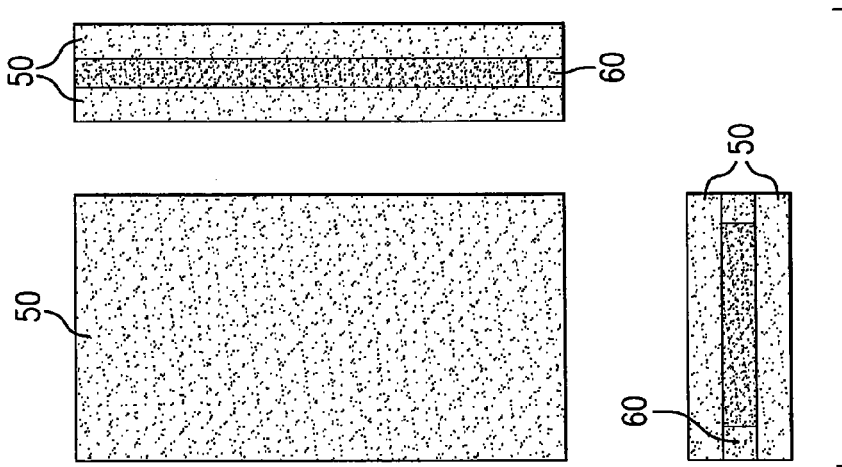

As shown in FIGS. 3A-3F, the capacitor plates 30, insulator plates 50 and spacers 60 are preferably arranged in a stack 20 of subassemblies, where each subassembly is configured as follows:

i. insulator plate 50 as shown in FIG. 3A;
ii. capacitor plate 30 having an exposed edge 35 oriented in a first direction 40 along an edge of the insulator plate 50, as shown in FIG. 3B;
iii. insulator plate 50, as shown in FIG. 3D, and
iv. capacitor plate 30 having the exposed edge 35 oriented in a second direction 45 which is opposite the first direction 40, as shown in FIG. 3E.

FIGS. 3C and 3F show spacers 60 placed in abutment with the respective capacitor plates 30 along the other edges of the capacitor plates 30 such that only the exposed edge 35 of each capacitor plate 30 is flush with outer edges of the stack 20. These spacers 60 may inserted into the stack 20 sequentially with each successive layer or into the partially completed stack 20 following the described layering of the insulator plates 50 and capacitor plates 30. As shown, three spacers 60 are utilized in each layer of the subassembly that includes a capacitor plate 30. The three spacers 60 shown in FIGS. 2C and 3 comprise two distinct configurations, one configuration aligned with a length of the capacitor plate 30 and one configuration aligned with a width of the capacitor plate 30. However, any suitable combination of one or more spacers 60 may alternatively be employed that insulates the non-exposed edges of each capacitor plate 30.

In summary, although a particular direction or alignment of the stack is not required, by way of illustration, the insulator plates 50 and capacitor plates 30 may be stacked vertically so that each capacitor plate 30 is positioned on a corresponding insulator plate 50 in alignment with only one edge in a first direction 40 and then alternating on an opposite edge in a second direction 45 of a subsequent insulator plate 50. As a result, the other edges of each capacitor plate 30 are not aligned with outer edges of the preform 10 and each insulator plate 50 extends beyond these other edges. The spacers 60 are then disposed in horizontal alignment with each capacitor plate 30 along these other edges.

The preform 10 is preferably formed in a stack 20 of subassemblies that are each configured so that the capacitor plates 30 are aligned along only one edge of each insulator plate 50. Each successive capacitor plate 30 in a stack 20 is preferably aligned along an opposite edge of each adjacent insulator plate 50 as the adjacent capacitor plate 30. As a result, from an edge of the subassembly or stack 20, one exposed edge 35 of each capacitor plate 30 is visible in the stack 20 along a height of the stack 20. Each of the other edges of each capacitor plate 30 includes an electrically insulating, ductile spacer 60 disposed in abutment therewith. This arrangement is best shown in FIG. 4.

Figure 4:
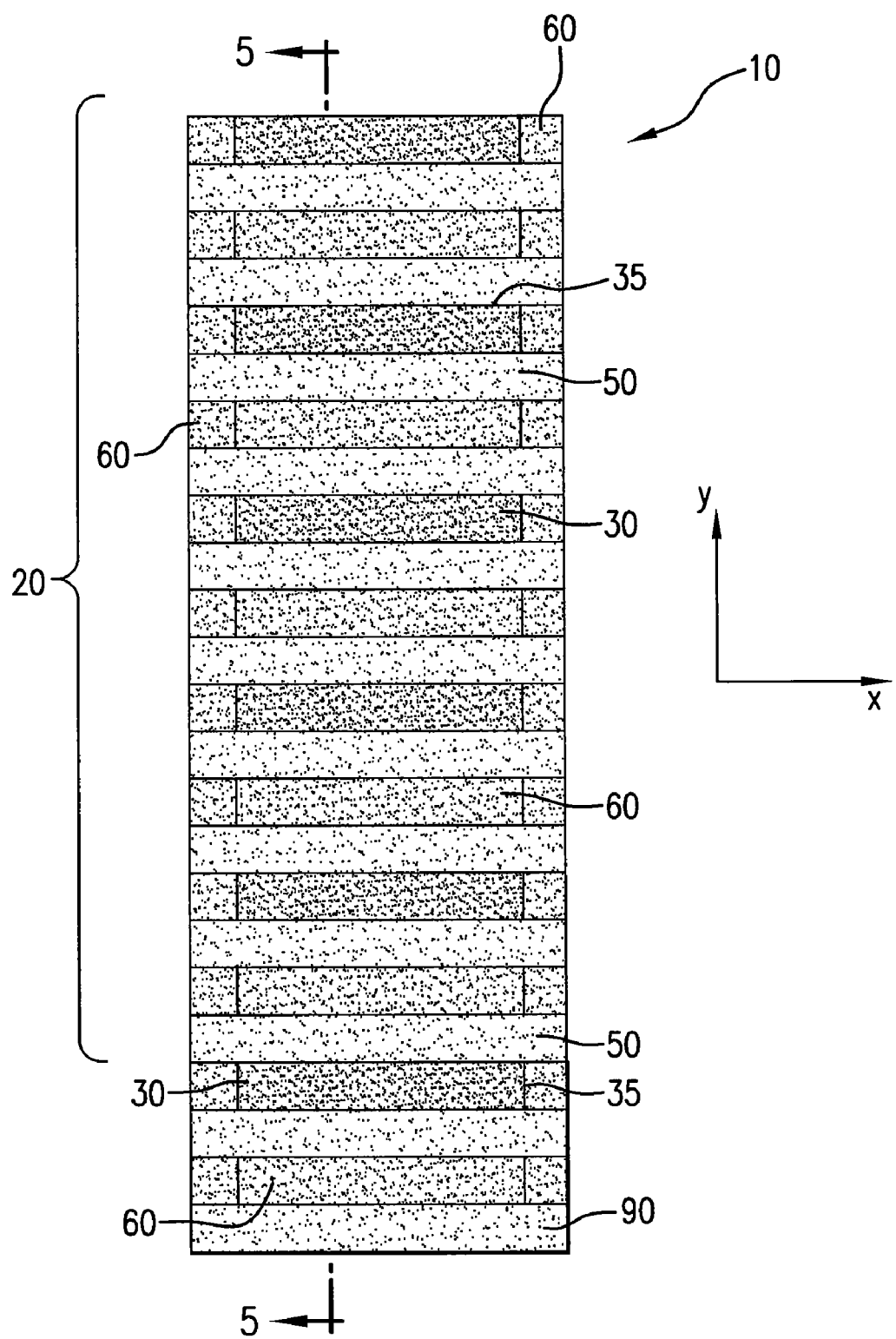
FIG. 4 is a schematic front view of a preform comprising a plurality of sub-elements according to one preferred embodiment of this invention.
Figure 5:
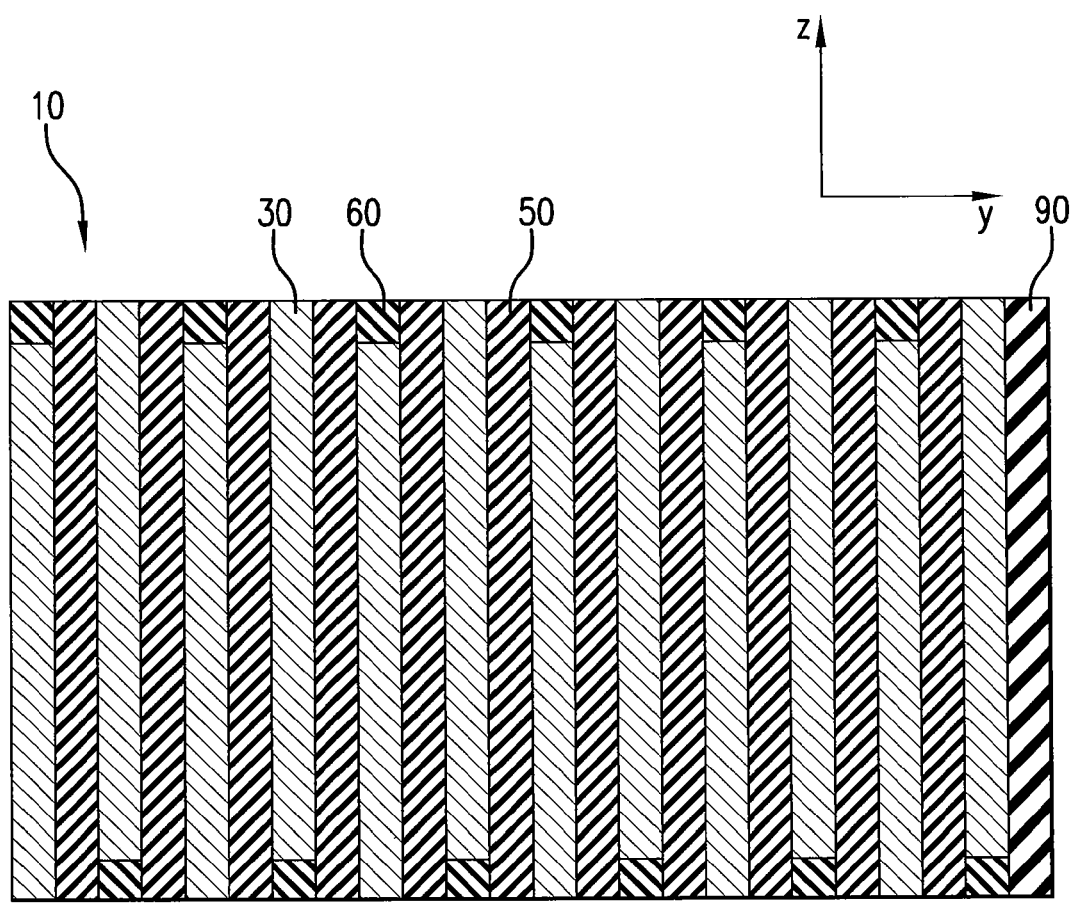
FIG. 5 is a schematic cross-sectional side view of a preform comprising a plurality of sub-elements according to one preferred embodiment of this invention.

The subassembly or stack 20 is then completed by adding a final insulator plate 90 on the final capacitor plate 30 in the stack 20, such as shown in FIG. 4. Preferably one or more subassemblies comprise a preform 10.

As shown, the insulator plate 50 may include a rectangular footprint and the capacitor plate 30 may include a smaller, rectangular footprint. As a result of this configuration, only a single aligned edge of the capacitor plate 30 is necessarily the exposed edge 35 and the other edges of the capacitor plate 30 are necessarily not aligned with the exterior edges of the stack 20. As shown in the embodiments of FIG. 3, specifically FIGS. 3C and 3F, the spacer 60 and the capacitor plate 30 together form a rectangular footprint corresponding in dimensions to the insulator plate 50. Although the schematics shown in the figures represent rectangular plates, any other suitable shape of capacitor plates 30, insulator plates 50 and spacers 50 may be used that permits alternating exposed edges 35 and insulated other edges of the each capacitor plate within the stack 20.

A corresponding method of manufacture of a capacitor or a structure having capacitive properties preferably further includes heating the preform 10 and/or stack 20 to a temperature of at least the known softening temperature. The preform 10 may be heated to a temperature sufficient to soften the materials comprising the preform 10, but not so high as to cause damage, decomposition or other deleterious changes.

Figure 6:
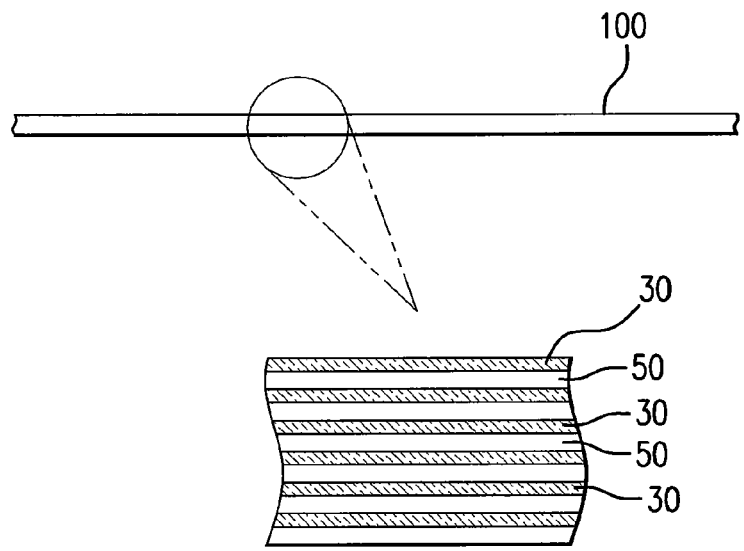
FIG. 6 is a schematic side view of a capacitor strand, including a magnified cross-sectional view of the strand.

Once the preform 10 achieves the desired temperature and/or ductile properties, the preform 10 may be drawn to fuse the stack 20 and to decrease the dimensions of the stack that are perpendicular to the direction of the draw. Suitably, the stack 20 is drawn in a direction of one of the orientations of the exposed edges 35 of the capacitor plates 30, such as along the z axis shown in FIG. 5. As the preform 10 is drawn along a longitudinal axis to reduce an overall diameter of the preform 10, the overall length of the preform 10 is extended. Specifically, as the cross-section of the ductile preform 10 is reduced, the preforms 10 is fused together into a single capacitor strand 100, such as shown in FIG. 6. The drawing action thereby results in unitized capacitor plates 30, insulator plates 50 and spacers 60 within each preform 10. As a result of the drawing process, the preforms 10 may be formed having diameters in the nanometer scale.

According to another preferred embodiment, a preassembly similar to that shown in FIG. 4 may be drawn in the x direction thereby generating preformed sections of alternating layers of electrode-dielectric-electrode. This predrawn structure may then be substituted for the preassembly shown in FIG. 3F and sandwiched with spacers 60 on each side. The resulting structure can then be drawn as described above thereby enabling shorter capacitive structures. Additional combinations of undrawn and predrawn subassemblies are considered that result in capacitive structures as defined herein.

Alternatively, the drawn preform 10 may be cut, bundled and drawn again to further decrease the diameter of the resulting strand and the frequency of the preforms 10 therein. The process of bundling, drawing, and cutting may be performed a single time, particularly for preforms having a directional geometry, or repeated many times until the desired diameter and/or frequency is attained.

Figure 7:
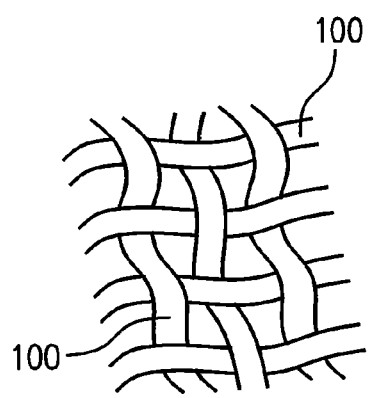
FIG. 7 is a representational view of fabric woven from one or more capacitor strands.
Figure 8:
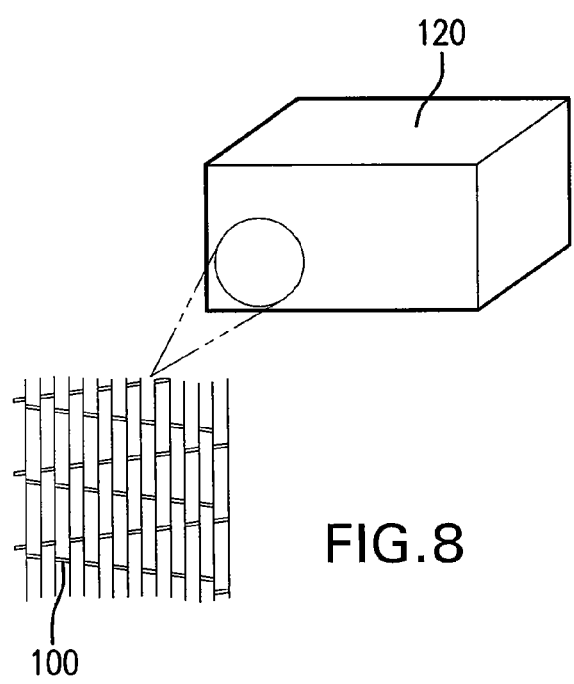
FIG. 8 is a schematic perspective view of a form manufactured in accordance with the invention.

Following the desired drawing, the resulting capacitor strand may be wound onto a spool, woven into fabric, such as shown in FIG. 7, and/or utilized as is in high-temperature and/or small scale applications requiring capacitors. As a result of the size and flexibility of the capacitor strand, capacitors may be formed having unique geometries, including clothing, vehicle panels and/or upholstery and/or nearly any conceivable shape or size. In addition, the resulting strand may be woven and/or formed, similar to carbon fiber, into a suitable form 120, such as shown in FIG. 8, thereby permitting many further applications.

The resulting capacitor or capacitor strand 100 may be connected to electrodes, for instance at each end of the capacitor strand, thereby creating an electric capacitance between the capacitor plates 30 when activated.

The diameter or thickness of the dielectric layer, the sized of the electrodes and the number of layers in the preform determine the capacitance of the resulting capacitor, together with the pulling parameters. Once the preform assembly is constructed, it can be pulled and the structure can be shrunk to a smaller size. For example, an initial footprint of 6 inch by 6 inch insulator and capacitor plates with 1 mm thickness yield 200 pF for capacitance for one layer. In a 6 inch thickness, 148 capacitors can be arranged (74×200 pF=14.7 nF). When the structure is drawn with a 1:100 ratio, the total capacitance goes to 147 uF. If the number of layers within the preform 10 is increased or the thickness of each stack in the preform 10 are reduced, the capacitance may be further increased. Since the materials that are considered for fabrication of the preforms 10 according to this invention are high temperature materials, capacitor devices with high power densities can be fabricated for high temperature, high power density application needs, such as in power electronic circuits in the transportation, space and defense industries.

While there has been shown and described what are at present considered the preferred embodiments of the invention, it will be obvious to those skilled in the art that various changes and modifications can be prepared therein without departing from the scope of the inventions defined by the appended claims.

What is claimed is:
1. A method of manufacturing a capacitor comprising:
 a. providing a plurality of electrically conductive, ductile capacitor plates, each of the capacitor plates having one exposed edge, all other edges thereof having an electrically insulating, ductile spacer disposed in abutment therewith, the capacitor plates and spacer having a known softening temperature;
 b. providing a plurality of electrically insulating, ductile insulator plates having a known softening temperature proximate to the softening temperature of the capacitor plates and spacer;
 c. assembling the capacitor plates and the insulator plates in a stack of subassemblies, each subassembly configured as follows:
  i. insulator plate,
  ii. capacitor plate having the exposed edge oriented in a first direction,
  iii. insulator plate, and
  iv. capacitor plate having the exposed edge oriented in a second direction which is opposite the first direction;
 d. completing the stack by adding a final insulator plate on a final capacitor plate iv;
 e. heating the stack to a temperature of at least the known softening temperature; and
 f. drawing the stack to fuse the stack and to decrease the dimensions of the stack that are perpendicular to the direction of the draw.

2. The method of manufacturing a capacitor of claim 1 wherein the insulator plate includes a rectangular footprint and the capacitor plate includes a smaller rectangular footprint.

3. The method of manufacturing a capacitor of claim 2 wherein the spacer and the capacitor plate together form a rectangular footprint corresponding in dimensions to the insulator plate.

4. The method of manufacturing a capacitor of claim 1 wherein spacers are provided on three other edges of the capacitor plate.

5. The method of manufacturing a capacitor of claim 1 wherein three spacers are utilized in each layer of the subassembly that includes a capacitor plate.

6. The method of manufacturing a capacitor of claim 5 wherein the three spacers comprise two distinct configurations, one configuration aligned with a length of the capacitor plate and one configuration aligned with a width of the capacitor plate.

7. The method of claim 1 further comprising:
 drawing the stack in a direction of one of the orientations of the exposed edges of capacitor plates.

8. The method of manufacturing a capacitor of claim 1 further comprising:
 drawing the stack into a strand; and
 winding the strand.

9. The method of manufacturing a capacitor of claim 8 further comprising:
 weaving the strand into a fabric.

* * * * *